United States Patent [19]

Suzuki et al.

[11] Patent Number: 5,321,689
[45] Date of Patent: Jun. 14, 1994

[54] MULTIPATH TRANSMISSION SYSTEM

[75] Inventors: Atsuhiko Suzuki; Kiyoshi Inoue; Kyosuke Hashimoto, all of Hiratsuka, Japan

[73] Assignee: The Furukawa Electric Co., Ltd., Tokyo, Japan

[21] Appl. No.: 24,815

[22] Filed: Mar. 1, 1993

Related U.S. Application Data

[63] Continuation of Ser. No. 691,445, Apr. 25, 1991, abandoned.

[30] Foreign Application Priority Data

Apr. 27, 1990 [JP] Japan ................................ 2-113751

[51] Int. Cl.$^5$ ................................................ H04J 3/14
[52] U.S. Cl. ................................. 370/16; 370/85.9; 371/8.1
[58] Field of Search .............. 370/85.9, 85.1, 14, 370/16, 85.12; 307/242, 242, 491; 340/825.01; 371/8.1

[56] References Cited

U.S. PATENT DOCUMENTS

| | | | |
|---|---|---|---|
| 4,423,506 | 12/1983 | Kawasaki et al. | 370/85.9 |
| 4,677,308 | 6/1987 | Wroblewski et al. | 370/85.1 |
| 4,805,169 | 2/1989 | Van Asselt | 370/85.9 |
| 4,847,832 | 7/1989 | Chang et al. | 370/85.1 |
| 4,964,120 | 10/1990 | Mostashari | 370/85.9 |
| 5,031,176 | 7/1991 | Magne et al. | 371/8.2 |

FOREIGN PATENT DOCUMENTS 2627036  8/1989  France .
2123589A 2/1984  United Kingdom .

Primary Examiner—Douglas W. Olms
Assistant Examiner—Min Jung
Attorney, Agent, or Firm—Frishauf, Holtz, Goodman & Woodward

[57] ABSTRACT

A multipath transmission system of this invention includes a plurality of multiplex nodes connected in parallel to three common signal transmission lines. The multiplex node includes a transmission control circuit which is allotted to a corresponding one of devices, receives a multiplex signal from the device in response to a transmission request of another multiplex node and transmits the multiplex signal to the signal transmission line. It includes a voltage detection circuit for detecting a voltage generated in at least one of the transmission lines, a reception control circuit for specifying the transmission state of the signal transmission line according to a voltage detected by the voltage detection circuit, a communication control device for communicating with the multiplex nodes to detect fault, and a voltage setting circuit for changing a voltage of the signal transmission line when fault is detected by the communication control device.

4 Claims, 9 Drawing Sheets

MULTIPATH TRANSMISSION SYSTEM

This application is a continuation of application Ser. No. 07/691,445, filed Apr. 25, 1991, now abandoned.

BACKGROUND OF THE INVENTION

1. Field of the Invention

This invention relates to a multipath transmission system for transmitting data among multiplex nodes connected to common signal transmission lines.

2. Description of the Related Art

This type of multipath transmission system includes a transmission system of LAN (Local Area Network) utilizing a CSMA/CD (Carrier Senser Multiple Access/Collision Detection) with an NDA (Non Destructive Arbitration). A typical example of the LAN is a CAN (Controller Area Network) used for data transmission in cars, for example.

In the multipath transmission system utilizing the CAN, terminal resistors $R_E$, $R_E$ are connected to both ends of two signal transmission lines A and B and a plurality of multiplex nodes are connected in parallel with the signal transmission lines A and B.

Each of the multiplex nodes is constructed by a communication control device, a transmission circuit for receiving a transmission signal from the communication control device and transmitting the same to the signal transmission line, and a reception circuit for receiving a signal from the signal transmission line and transmitting the same to the communication control device.

The reception circuit outputs a signal received from the signal transmission line to a comparator of the communication control device. An adequate threshold voltage is applied to the comparator to reduce the amplitude of the transmission signal to a permissible level so that the range of an input voltage in the common mode of the reception circuit can be widen and influence by noises can be reduced.

The transmission circuit includes two field effect transistors (FET) and the FETs are connected to the signal transmission lines.

Therefore, when the multiplex nodes are set in the passive state, that is, when a recessive bit is output in the transmission system of (CSMA/CD+NDA), each FET is set in the OFF state, no potential difference occurs between the signal transmission lines and a high impedance state is set the output terminal. Further, when the multiplex nodes are set in the dominant state, that is, when a dominant bit is output in the transmission system of (CSMA/CD+NDA), each FET is set in the ON state, a current is supplied to one of the transmission lines and a current is drawn from the other signal transmission line. Therefore, in the dominant state, a potential difference occurs between the signal transmission lines and the reception circuit connected to the signal transmission line detects the potential difference and converts this signal in order to recognize the signal face. As a result, the communication control device can detect the dominant state.

With the above transmission system, when an accident such as an open circuit or short circuit occurs in one of the signal transmission lines, for example, and thus when fault occurs in the transmission system, a potential between the signal transmission lines is changed from a transmissible value so that a signal cannot be correctly transmitted between all of the multiplex nodes associated with the signal transmission line.

SUMMARY OF THE INVENTION

This invention has been made in view of the above problem, and an object of this invention is to provide a multipath transmission system which permits data to be efficiently and reliably transmitted among multiplex nodes even when fault occurs in the signal transmission line and which can be preferably applied to cars.

The above object can be attained by a multipath transmission system of this invention and the multipath transmission system comprises:

at least three common signal transmission lines;

a plurality of multiplex nodes connected in parallel to the signal transmission lines, each of the multiplex nodes including a transmission circuit which is allotted to a corresponding device, receives a multiplex signal from a corresponding device in response to a transmission request of another multiplex node, and transmitting the multiplex signal to the transmission line;

voltage detection means for detecting a voltage occurring in at least one of the signal transmission lines;

specifying means for specifying the transmission state of each of the signal transmission lines according to the voltage detected by the voltage detecting means;

fault detecting means for communicating with each of the multiplex nodes to detect fault; and voltage changing means for changing a voltage of the signal transmission line when fault is detected by the fault detecting means.

According to the multipath transmission system, three or more signal transmission lines are used and each multiplex node detects a voltage of at least one of the signal transmission lines, specifies the transmission state of each of the signal transmission lines according to the detected voltage, and if at least one of the multiplex nodes communicates with each of the multiplex nodes to detect fault, a preset potential difference is caused between the signal transmission lines by changing the voltage of the signal transmission line so as to change the state of each of the signal transmission lines into the signal transmissible state, and therefore, a signal can be transmitted among the multiplex nodes even when fault occurs in the transmission line, thereby enhancing the reliability of the signal transmission and the transmission efficiency.

The aforementioned objects, features and advantages of this invention will become more apparent in the following detailed description made with reference to the accompanying drawings.

DESCRIPTION OF THE PREFERRED EMBODIMENTS

Figure 1:
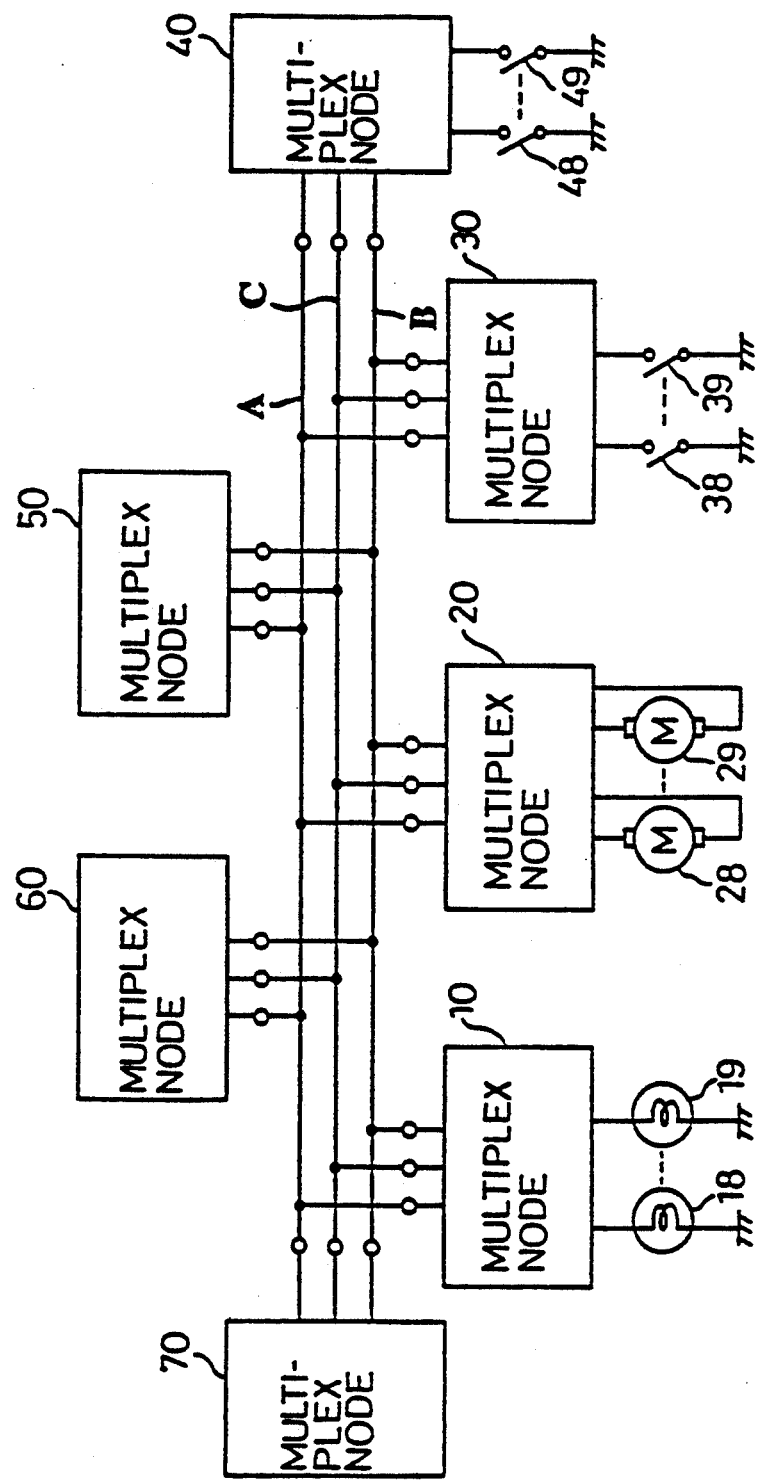
FIG. 1 is a diagram showing the layout of a multipath transmission system incorporated into a car and is a constructional block diagram showing the construction of a multipath transmission system according to this invention.

Referring to FIG. 1, a multipath transmission system is incorporated in a car. The multipath transmission system includes a plurality of multiplex nodes, for example, multiplex nodes 10 to 70 and signal transmission lines A, B and C. The multiplex nodes 10 to 70 are connected in parallel to the three signal transmission lines A, B and C. The multiplex nodes 10 to 70 transmit data signals via the signal transmission lines A, B and C. For example, among the multiplex nodes 10 to 70, the multiplex node 10 is connected with a headlight 18 and a turn signal light 19, the multiplex node 20 is connected with a door lock motor 18 and a door unlock motor 29, the multiplex node 30 is connected with a headlight switch 38 and a turn signal switch 39, and the multiplex node 40 is connected with a door lock switch 48 and a door unlock switch 49.

The multiplex node 10 turns on or off the headlight 18 and the turn signal light 19 in response to signals of the headlight switch 38 and the turn signal switch 39 transmitted from the multiplex node 30.

The multiplex node 20 drives the door lock motor 28 and door unlock motor 29 in response to signals of the door lock switch 48 and door unlock switch 49 transmitted from the multiplex node 40.

Further, the multiplex node 50 controls an air conditioner (not shown) in the car, the multiplex node 60 controls an operation switch (not shown) of the air conditioner, and various signals for controlling the air conditioner are transmitted between the multiplex nodes 50 and 60. The multiplex node 70 is connected with various indicators (not shown).

Figure 2:
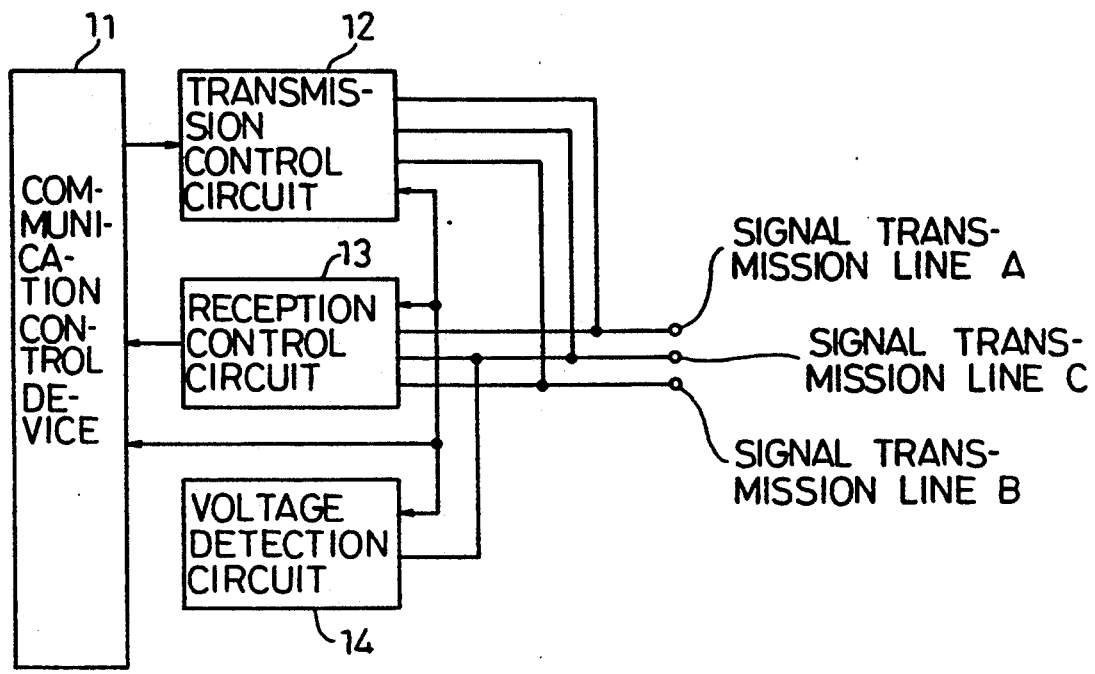
FIG. 2 is a constructional block diagram showing a first embodiment of the multipath transmission system shown in FIG. 1.

FIG. 2 is a diagram concretely showing the multiplex node 10 of the multipath transmission system shown in FIG. 1. The construction of the multiplex nodes 20, 30, 50 and 60 is the same as that of the multiplex node 10, and the construction of the multiplex node 10 is explained as an example here for convenient explanation.

Referring to the first embodiment shown in FIG. 2, the multiplex node 10 includes a communication control device 11 for effecting the communication process control, a transmission control circuit 12 for receiving a transmission signal from the communication control device 11 and transmitting the same to the signal transmission lines A, B and C, a reception control circuit 13 for supplying reception signals received from the signal transmission lines A, B and C to the communication control device 11, and a voltage detection circuit 14 for detecting a voltage of one of the signal transmission lines.

The communication control device 11 effects the communication process control for receiving an output signal from the device connected thereto, constructing the output signal in a frame configuration for each preset data unit, and transmitting the signal formed in the frame configuration as a transmission signal to the transmission control circuit 12. Further, the communication control device 11 effects the communication process control for receiving a reception signal formed in the frame configuration from the reception control circuit 13, deriving only a signal necessary therefor from the reception signal, transmits the signal to the device connected thereto, and transmitting a acknowledge signal (ACK signal) to the transmission control circuit 12 when the signal reception is correctly effected.

The transmission control circuit 12 is connected to the multiple transmission lines A, B and C, converts a transmission signal (including the ACK signal) from the communication control device 11 transmits the same to the multiple transmission lines A, B and C.

The reception control circuit 13 is connected to the multiple transmission lines A, B and C, and when receiving a reception signal (including the ACK signal) from the multiple transmission lines A, B and C, it outputs the reception signal to the communication control device 11.

The voltage detection circuit 14 is connected to one of the transmission lines, for example, the transmission line C, the communication control device 11, the transmission control circuit 12 and the reception control circuit 13, and it detects a voltage of the transmission line C and informs the communication control device 11, the transmission control circuit 12 and the reception control circuit 13 of the state of the transmission line C.

Figure 3:
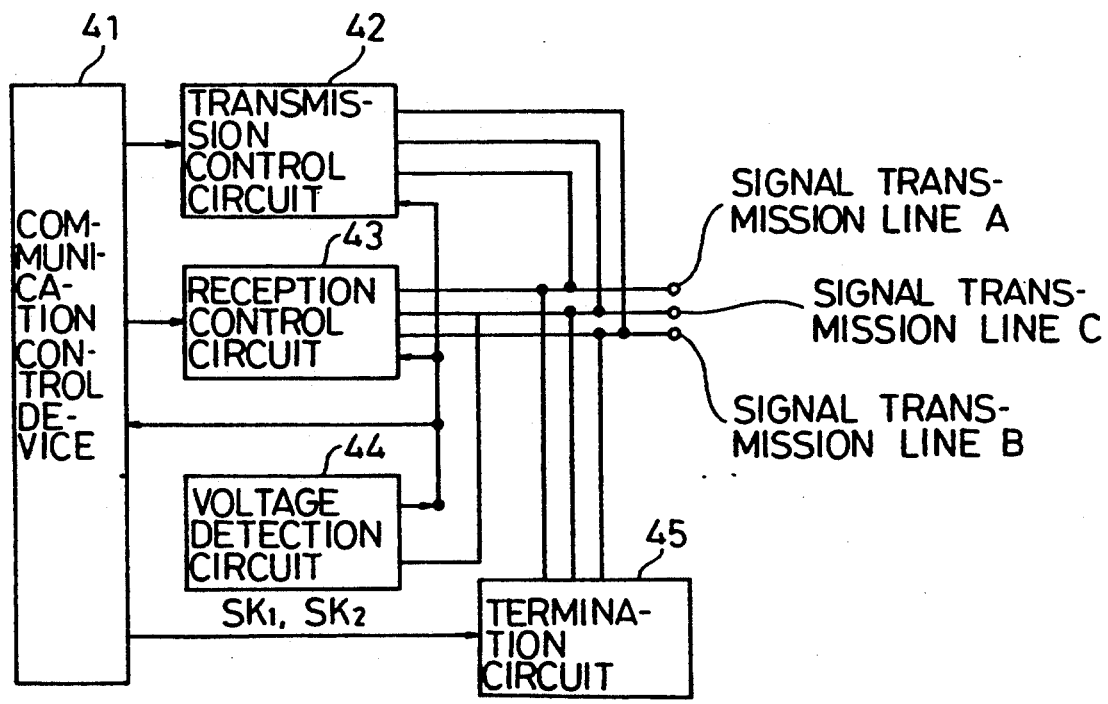
FIG. 3 is a constructional block diagram showing a second embodiment of the multipath transmission system shown in FIG. 1.

Referring to a second embodiment shown in FIG. 3, a multiplex node 40 connected to the terminal ends of signal transmission lines A, B and C includes a communication control device 41, a transmission control circuit 42, a reception control circuit 43 and a voltage detection circuit 44 having the same function as the multiplex node 10 and further includes a terminal circuit 45 having terminal resistors connected to both ends of the transmission lines A, B and C.

Figure 4:
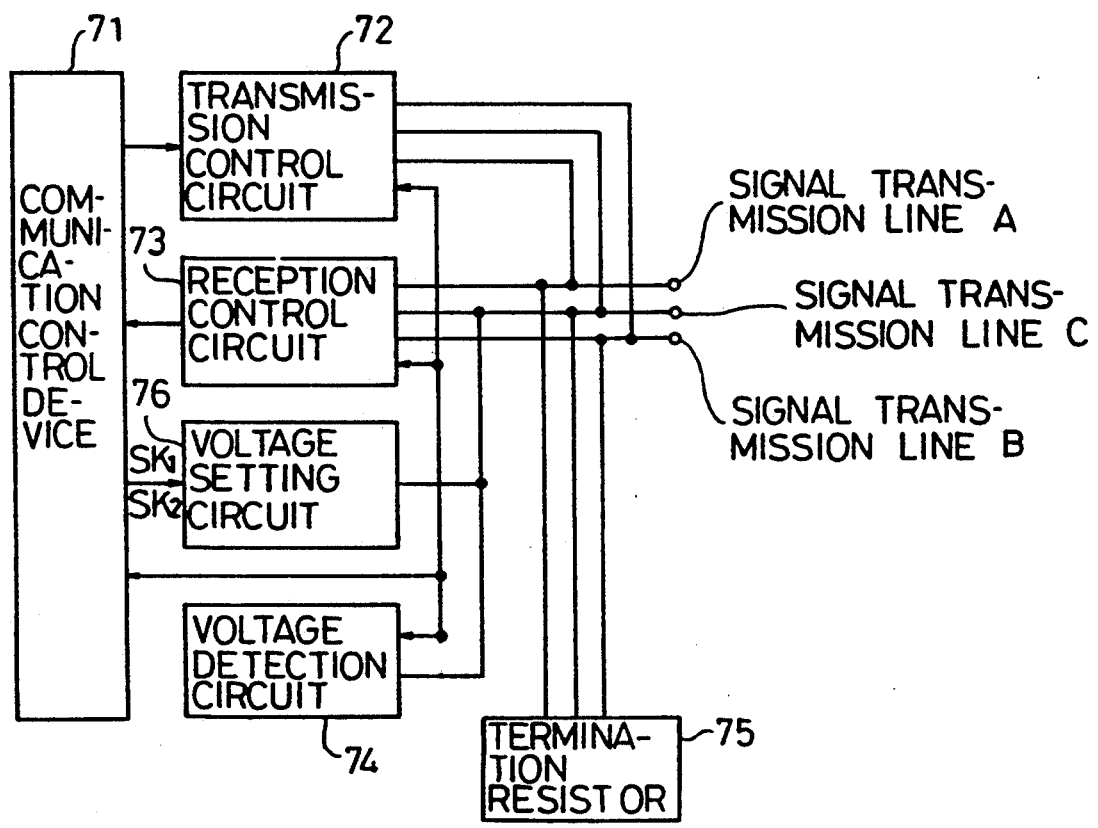
FIG. 4 is a constructional block diagram showing a third embodiment of the multipath transmission system shown in FIG. 1.

Referring to a third embodiment shown in FIG. 4, a multiplex node 70 connected to the terminal ends includes a communication control device 71, a transmission control circuit 72, a reception control circuit 73, a voltage detection circuit 74 and a terminal resistor 75 having the same function as the multiplex node 40 and further includes a voltage generation circuit 76 for applying a voltage to the signal transmission line C.

Figure 5:
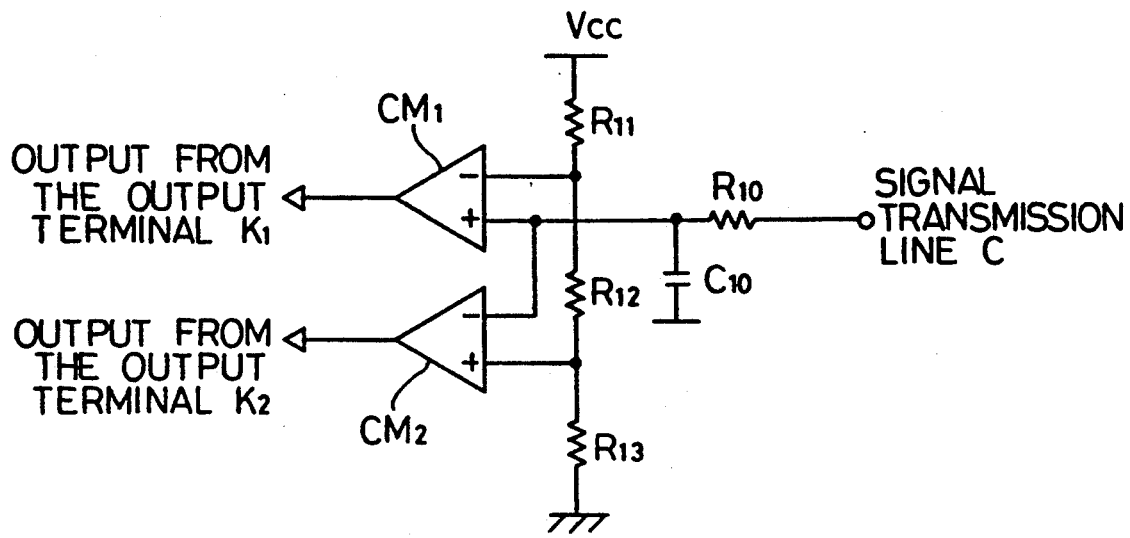
FIG. 5 is a circuit diagram showing one embodiment of a voltage detection circuit shown in FIG. 1.

The concrete construction of each of the voltage detection circuits is shown in FIG. 5. Referring to FIG. 5, the one terminal of a voltage comparator circuit $CM_1$ and the one terminal of a voltage comparator circuit $CM_2$ are applied with a voltage $V_o$ of the transmission line C via a filter circuit formed of a resistor $R_{10}$ and a capacitor $C_{10}$. The other terminal of the voltage comparator circuit $CM_1$ and the other terminal of the voltage comparator circuit $CM_2$ are applied with reference voltages $V_1$ and $V_2$ which are obtained by dividing a power source voltage Vcc by resistors $R_{11}$ to $R_{13}$. As a result, the voltage comparator circuits $CM_1$ and $CM_2$ check whether or not the voltage $V_0$ of the transmission line C is within the range of the reference voltages $V_1$ and $V_2$ by comparing the voltages applied to both of the terminals. That is, when the voltage $V_o$ is within the range of the reference voltages $V_1$ and $V_2$, the voltage comparator circuits $CM_1$ and $CM_2$ output "0" and "0" indicating the normal state to output terminals $K_1$ and $K_2$. When the voltage $V_0$ exceeds the range of the reference voltages $V_1$ and $V_2$, for example, when the transmission line B is broken on the ground, the voltage comparator circuits $CM_1$ and $CM_2$ output "0" and "1" indicating the abnormal state to the output terminals $K_1$ and $K_2$. When the voltage $V_0$ exceeds the range of the reference voltages $V_1$ and $V_2$, for example, when failure occurs anywhere in the voltage detection circuits and the transmission line C was set at 5 voltages, the voltage comparator circuits $CM_1$ and $CM_2$ output "1" and "0" indicating the abnormal state to the output terminals $K_1$ and $K_2$.

Figure 6:
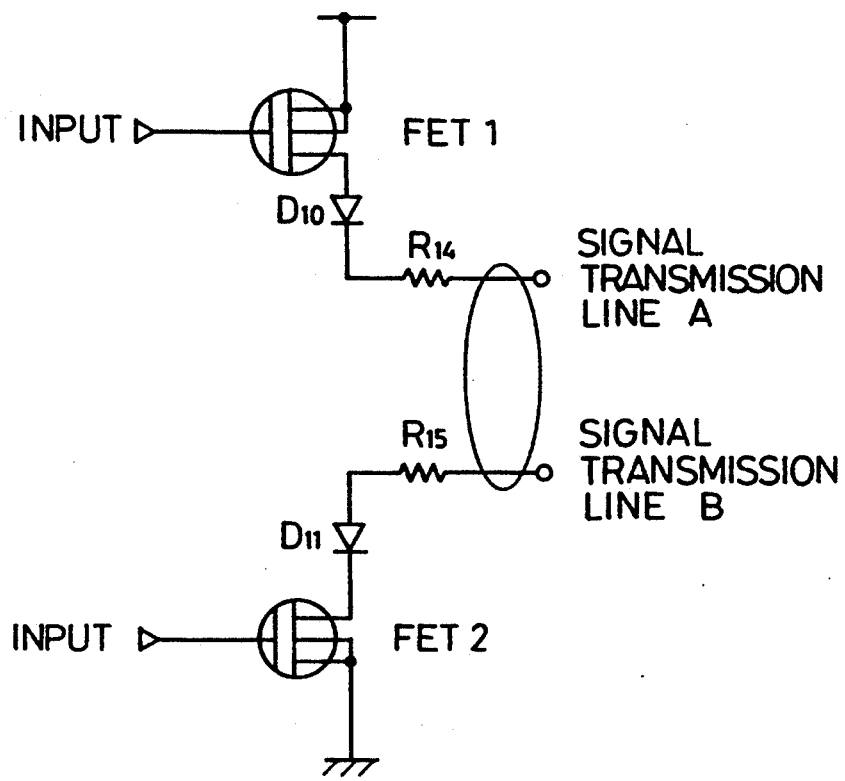
FIG. 6 is a circuit diagram showing one embodiment of a transmission control circuit shown in FIG. 1.

The concrete circuit construction of each of the transmission control circuits is shown in FIG. 6. Referring to FIG. 6, the drain terminals of FET1 and FET2 are connected to filter circuits formed of diodes $D_{10}$ and $D_{11}$ and resistors $R_{14}$ and $R_{15}$. The FET1 is connected to a filter circuit formed of a diode $D_{10}$ and the resistor $R_{14}$ to the transmission line A. The FET2 is connected to a filter circuit formed of a diode $D_{11}$ and the resistor $R_{15}$ to the transmission line B. That is, when the multiplex node is set in the passive state, each FET is set in the OFF state so that no potential difference may occur between the signal transmission lines A and B and a high impedance state may occur the output terminals. Further, when the multiplex node is set in the dominant state, each FET is set in the ON state, causing a current to flow into the signal transmission line A and receiving a current from the other transmission line B. Therefore, in the dominant state, a potential occurs between the signal transmission lines A and B and the reception circuit connected to the signal transmission lines A and B detects the potential difference. As a result, the communication control device can detect the dominant state.

Figure 7:
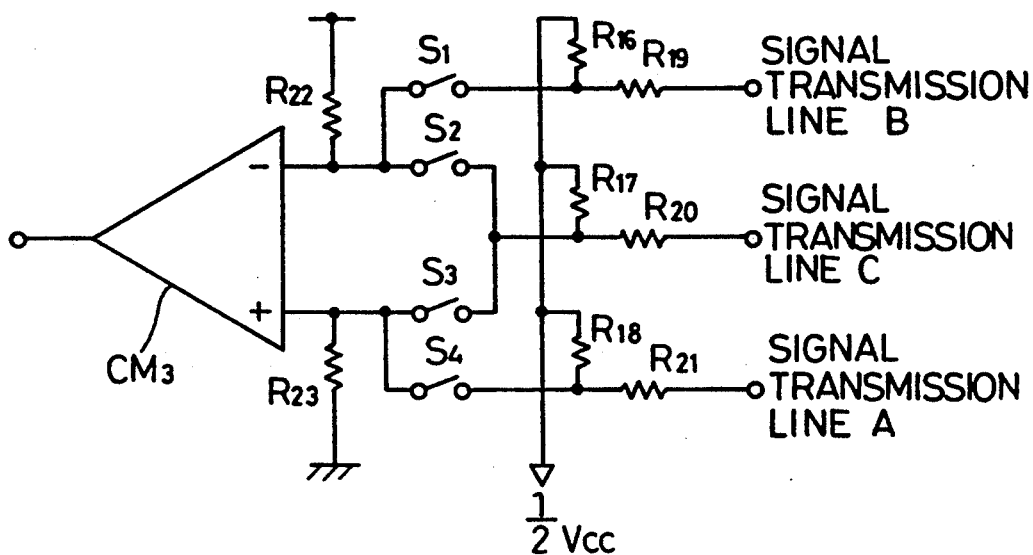
FIG. 7 is a circuit diagram showing one embodiment of a reception control circuit shown in FIG. 1.

The concrete construction of each reception control circuit is shown in FIG. 7. Referring to FIG. 7, a power source voltage ½ Vcc is applied to the signal transmission lines A, B and C via resistors $R_{16}$, $R_{17}$ and $R_{18}$. One-side ends of the signal transmission lines A, B and C are connected to the input terminals of a voltage comparator $CM_3$ via switching elements $S_1$ to $S_4$ shown in the drawing. The ON/OFF states of the switching elements $S_1$ to $S_4$ are controlled by the voltage detection circuit, and the voltage detection circuit controls the ON/OFF states of the switching elements $S_1$ to $S_4$ in response to signals input from the output terminals $K_1$ and $K_2$ according to combinations shown in the following first table. Resistors $R_{16}$ to $R_{23}$ are resistors for voltage division and setting of the threshold voltage.

| FIRST TABLE | | | | | |
|---|---|---|---|---|---|
| $K_1$ | $K_2$ | $S_1$ | $S_2$ | $S_3$ | $S_4$ |
| 0 | 0 | ON | OFF | OFF | ON |
| 1 | 0 | ON | OFF | ON | OFF |
| 0 | 1 | OFF | ON | OFF | ON |

Further, the reception control circuit transmits signals in the balanced transmitting condition set by using the positive logic for the signal transmission line A and the negative logic for the signal transmission line B in the normal state in which outputs of the output terminals $K_1$ and $K_2$ are "0" and "0". That is, the signal reception is effected by setting the signal transmission line A in the dominant state when a voltage is high and setting the signal transmission line B in the dominant state when a voltage is low. Further, the reception control circuit receives signals in the unbalanced transmitting condition set by using the signal transmission line C as a fixed potential line and the negative logic for the signal transmission line B in the abnormal state in which outputs of the output terminals $K_1$ and $K_2$ are "1" and "0" and receives signals in the unbalanced transmitting condition set by using the signal transmission line C as a fixed potential line and the positive logic for the signal transmission line A in the abnormal state in which outputs of the output terminals $K_1$ and $K_2$ are "0" and "1". Since high frequency components of the transmission wave are little contained in the signal transmission line C under the normal transmission state and the signal transmission lines A and B surrounded by the signal transmission line C can be used, the cost of the signal transmission line can be reduced equivalent to that of the conventional two-core shield line.

Figure 8:
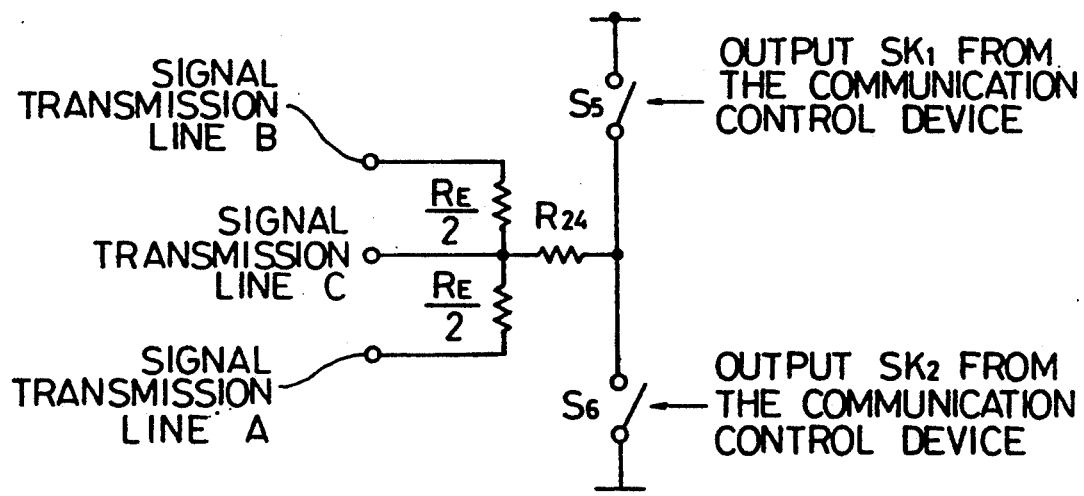
FIG. 8 is a circuit diagram showing one embodiment of a terminal circuit shown in FIG. 1.

The concrete circuit construction of the terminal circuit 45 is shown in FIG. 8. Referring to FIG. 8, a resistor $R_E$ connected between the ends of the signal transmission lines A and B is divided into two portions of $R_E/2$ by the signal transmission line C, and the signal transmission line C is connected to switching elements $S_5$ and $S_6$ via a resistor $R_{24}$. The resistance of the resistor $R_{24}$ is relatively smaller than that of the terminal resistor. The switching element $S_5$ is constructed to be turned on when an output $SK_1$ from the communication control device is "1" and the switching element $S_6$ is constructed to be turned on when an output $SK_2$ from the communication control device is "1". Further, the terminal circuit 45 is also used instead of the voltage generation circuit 76 for the signal transmission line C, and when it is required to forcedly set outputs of the output terminals $K_1$ and $K_2$ to "1" and "0" in the multiplex node 70, for example, the switching element $S_5$ is turned on by the control of the communication control device 71. When it is required to forcedly set outputs of the output terminals $K_1$ and $K_2$ to "0" and "1", the switching element $S_6$ is turned on by the control of the communication control device 71.

In this embodiment, the terminal circuit 45 and the voltage generation circuit 76 which can control the voltage in the signal transmission line C are included in a system. So far as controlling of each other concerned. Output terminals $SK_1$ and $SK_2$ of terminal circuit 45 and that of the voltage generation circuit 76 are operated each other by synchronization, or are respectively used as main or sub.

Figure 9:
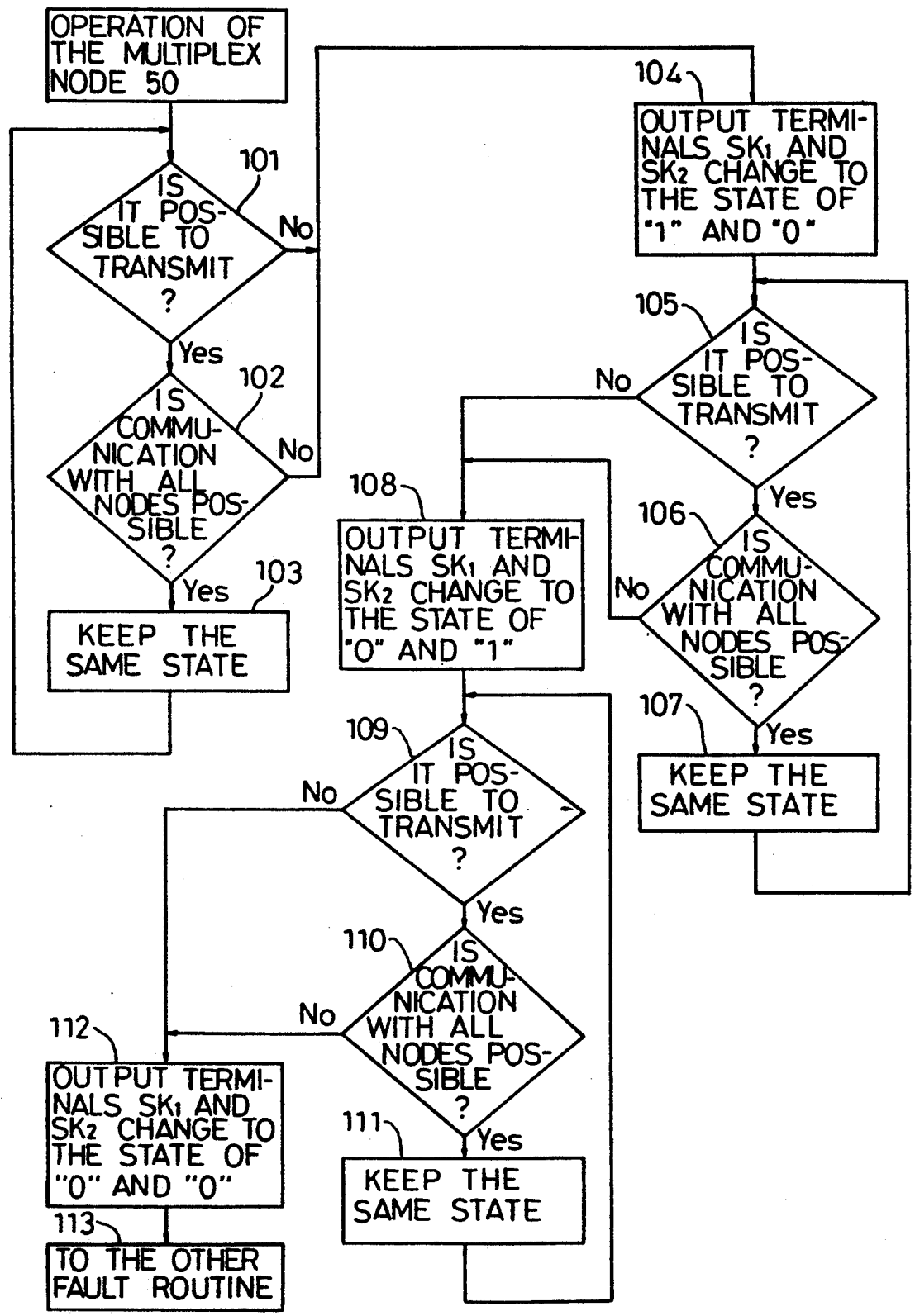
FIG. 9 is a flowchart for illustrating the operation of the fault correction effected for the signal transmission line by a multiplex node shown in FIG. 1.

Next, the operation of the fault correction with respect to the signal transmission line by the multiplex node 70 is explained with reference to the flowchart shown in FIG. 9. In this case, the outputs of the output terminals $K_1$ and $K_2$ of the voltage detection circuit 54 are set to the normal state of "0" and "0" and the switching elements $S_1$ and $S_4$ among the switching elements $S_1$ to $S_4$ are set shown in FIG. 7 in the ON state and are set the switching elements $S_2$ and $S_3$ in the OFF state.

First, the communication control device 71 can check whether the signal transmission can be effected or not according to whether each multiplex node, for example, the multiplex node 30 for the multiplex node 10 or the multiplex node 40 for the multiplex node 20 can correctly transmit frames or not when the frame of the transmission signal is received (step 101).

Next, whether communication with all of the multiplex nodes is possible or not is checked by determining the reception of an ACK signal from all of the multiplex nodes in the same manner as described above (step 102). In this case, if it is determined that the communication is possible, the normal state in which the outputs $SK_1$ and $SK_2$ from the communication control device are set at "0" and "0" is maintained (step 103) and the checking operation in the step 101 is effected again.

Further, when it is determined in the step 101 that the transmission is impossible, or when it is determined in the step 102 that communication with all of the multiplex nodes is impossible, the output terminal $SK_1$ and $SK_2$ of communication control device 71 are set at the output state of "1" and "0" (step 104), therefore the output state of the output terminals $K_1$ and $K_2$ are set the state of "1" and "0" and the switching elements $S_1$ and $S_3$ among the switching elements $S_1$ to $S_4$ of the reception control circuit 73 shown in FIG. 7 are set in the ON state and the switching elements $S_2$ and $S_4$ are set in the OFF state. Then, whether transmission with respect to the reception multiplex node is possible or not is checked in the same manner as in the step 101 (step 105).

In this case, if the transmission with respect to the reception multiplex node is possible, then whether communication with all of the multiplex nodes is possible or not is checked in the same manner as in the step 102 (step 106). In this case, if the communication is possible, the outputs of the output terminals $SK_1$ and $SK_2$ are kept at the output state of "1" and "0" (step 107) and then the determination in the step 105 is effected again.

If it is detected in the step 105 that the transmission is impossible, or when it is determined in the step 106 that communication with all of the multiplex nodes is impossible, the switching elements $S_5$ and $S_6$ of the voltage generating circuit 76 are respectively forcedly turned off and on to change the output state of the output terminals $K_1$ and $K_2$ of voltage detecting circuit 74 to the state of "0" and "1" (step 108). And the switching elements $S_1$ and $S_3$ among the switching elements $S_1$ to $S_4$ of the reception control circuit 73 shown in FIG. 7 are set in the OFF state and the switching elements $S_2$ and $S_4$ are set in the ON state. Then, whether transmission with respect to the reception multiplex node is possible or not is checked in the same manner as in the step 101 (step 109).

In this case, if the transmission with respect to the reception multiplex node is possible, then whether communication with all of the multiplex nodes is possible or not is checked in the same manner as in the step 102 (step 110). In this case, if the communication is possible, the outputs $SK_1$ and $SK_2$ from the communication control device are kept in the output state of "0" and "1" (step 111) and then the determination in the step 109 is effected again.

If it is detected in the step 109 that the transmission is impossible, or when it is determined in the step 110 that communication with all of the multiplex nodes is impossible, it is determined that the fault is not in the transmission line and the switching elements $S_5$ and $S_6$ of the voltage generation circuit 76 are forcedly set in the OFF state to return the output state of the output terminals $K_1$ and $K_2$ to the state of "0" and "0" (step 112). Then, the operation for the other fault correction routine is effected (step 113).

Figure 10:
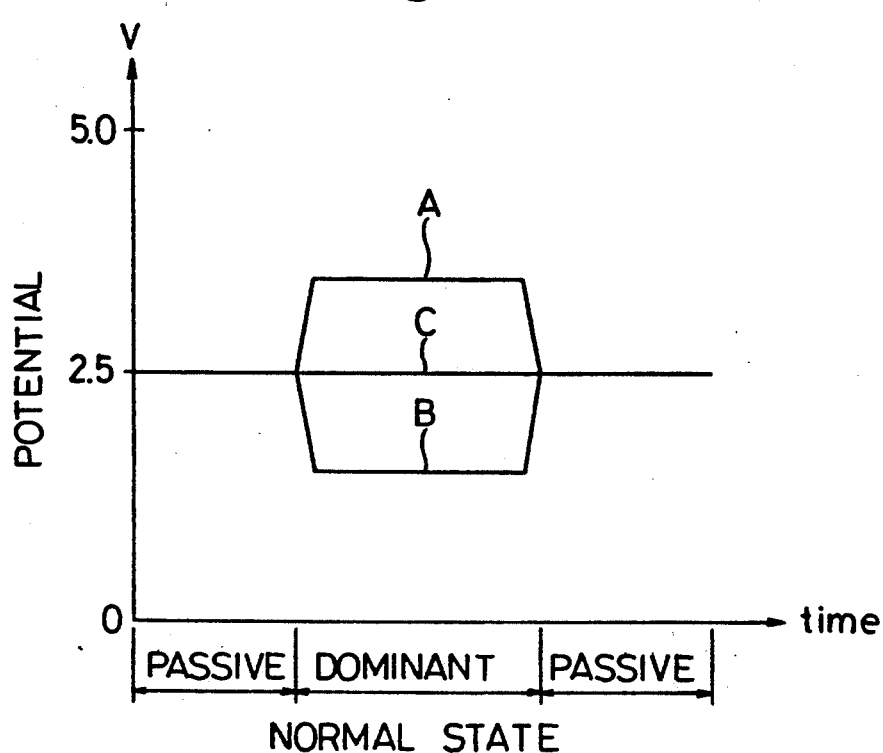
FIG. 10 is a diagram showing a potential in the normal transmission state.
Figure 11:
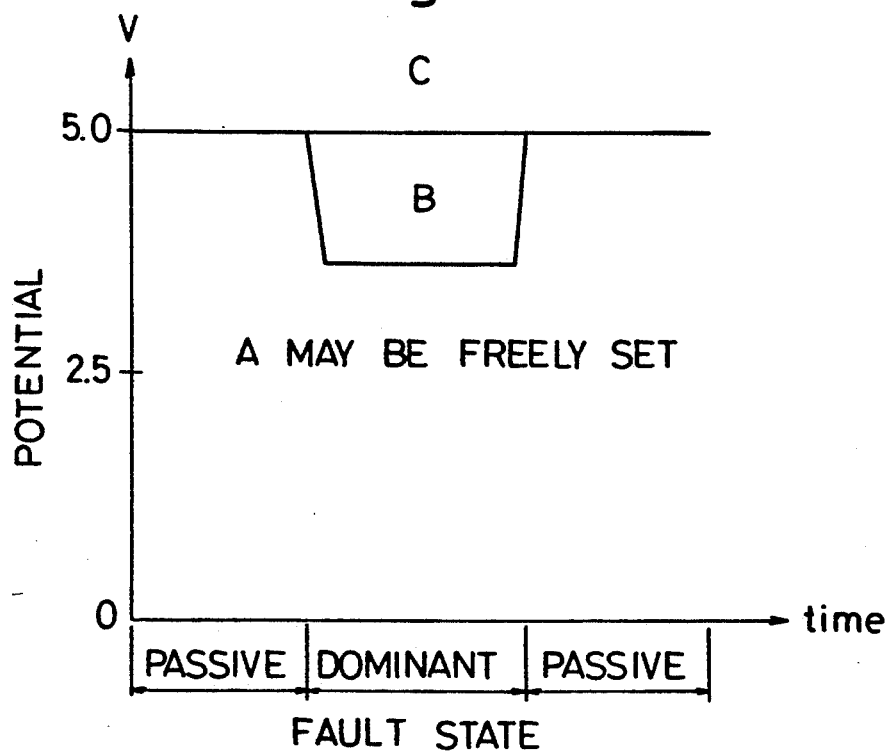
FIG. 11 is a diagram showing a potential in the abnormal transmission state.

Therefore, in a case where the state of the outputs from the output terminals $K_1$ and $K_2$ is set in the normal state of "0" and "0" in the multiplex node 70, a potential difference occurs between the signal transmission lines A and B in the dominant state as shown in FIG. 10. As a result, the reception control circuit 73 connected to the signal transmission lines A and B detects the potential difference and the communication control circuit 71 can detect the dominant state. Further, in a case where one of the signal transmission lines is fixed at a constant voltage, where one of the signal transmission lines is broken, or where two of the signal transmission lines are short-circuited to each other, the output terminals $SK_1$ and $SK_2$ are set to the state of "1" and "0", so that the switching elements $S_1$ and $S_3$ among the switching elements $S_1$ to $S_4$ of the reception control circuit 73 shown in FIG. 7 can be set in the ON state and the switching elements $S_2$ and $S_4$ can be set in the OFF state. If the transmission is possible in this state, a potential occurs between the signal transmission lines C and B in the dominant state as shown in FIG. 11. As a result, the reception control circuit 73 connected to the signal transmission lines C and B detects the potential difference and the communication control circuit 51 can detect the dominant state. In this case, the potential of the transmission line A may be freely set.

Figure 12:
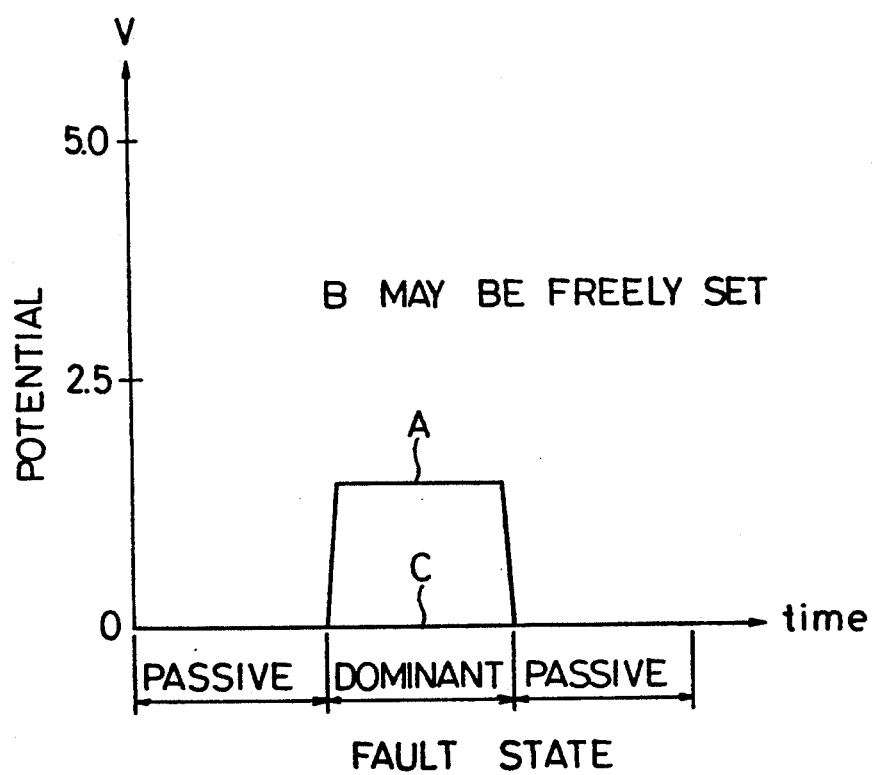
FIG. 12 is a diagram showing a potential in the abnormal transmission state.

Further, in another case, the output terminals $SK_1$ and $SK_2$ are changed to the state of "0" and "1" when the transmission is impossible so that the switching elements $S_1$ and $S_3$ among the switching elements $S_1$ to $S_4$ of the reception control circuit 73 shown in FIG. 7 can be set in the OFF state and the switching elements $S_2$ and $S_4$ can be set in the ON state. If the transmission is possible in this state, a potential occurs between the signal transmission lines A and C in the dominant state as shown in FIG. 12. As a result, the reception control circuit 73 connected to the signal transmission lines A and C detects the potential difference and the communication control device 71 can detect the dominant state. In this case, the potential of the transmission line B may be freely set.

As described above, according to the multipath transmission system of this invention, even when an accident such as breakage or short-circuit occurs in the signal transmission line, a preset potential occurs between the signal transmission lines so as to permit the signal transmission between the multiplex nodes, thereby making it possible to enhance the reliability of the multiplex transmission of the whole system.

Figure 13:
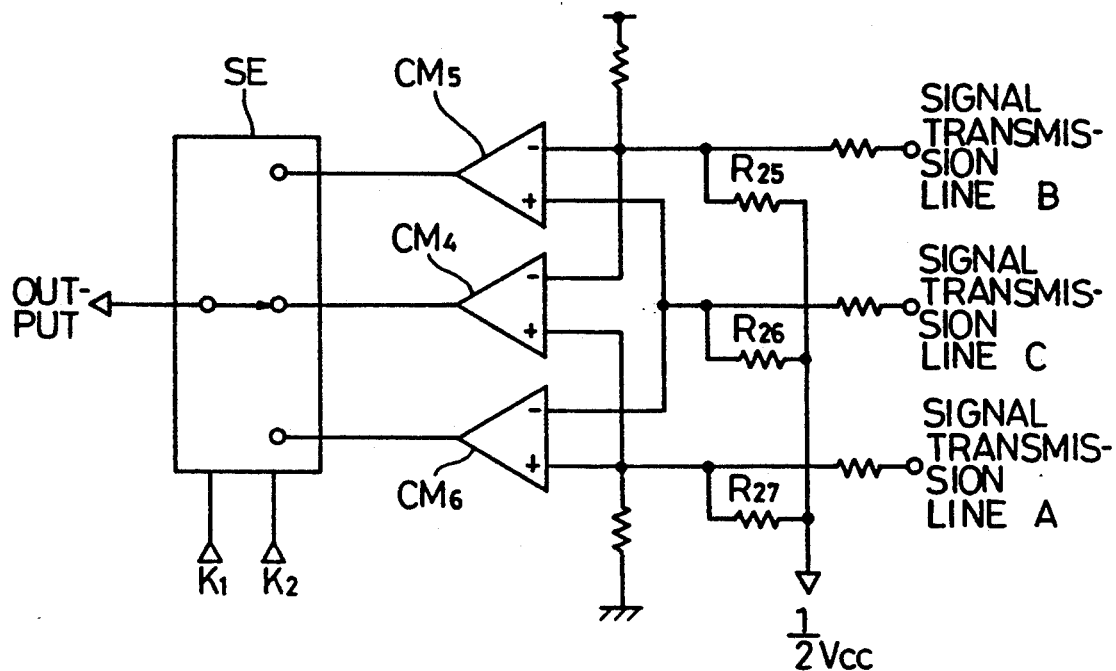
FIG. 13 is a diagram showing another embodiment of the reception control circuit.

This invention is not limited to the multipath transmission system of the above embodiment. Referring to FIG. 13, the reception control circuit includes three voltage comparator circuits $CM_4$ to $CM_6$ and a select circuit SE connected to the output terminals of the voltage comparator circuits $CM_4$ to $CM_6$. A power source voltage $\frac{1}{2}$ Vcc is applied to the transmission lines A, B and C via resistors $R_{25}$, $R_{26}$ and $R_{27}$ in the same manner as shown in FIG. 7. One-side ends of the transmission lines A, B and C and the input terminals of the voltage comparator circuits $CM_4$ to $CM_6$ are connected as shown in the drawing.

The select circuit SE receives output signals (potential difference) from the voltage comparator circuits $CM_4$ to $CM_6$. The select circuit SE selects the received output signal according to the outputs of the output terminals $K_1$ and $K_2$. That is, the select circuit SE selects the output signal from the voltage comparator circuit $CM_4$ when $K_1=K_2=0$, selects the output signal from the voltage comparator circuit $CM_5$ when $K_1=1$, and selects the output signal from the voltage comparator circuit $CM_6$ when $K_2=1$, and then transmits the selected signal to the communication control device. In this case, a plurality of switching elements shown in FIG. 7 are not necessary, thus making it possible to reduce the number of parts used.

Figure 14:
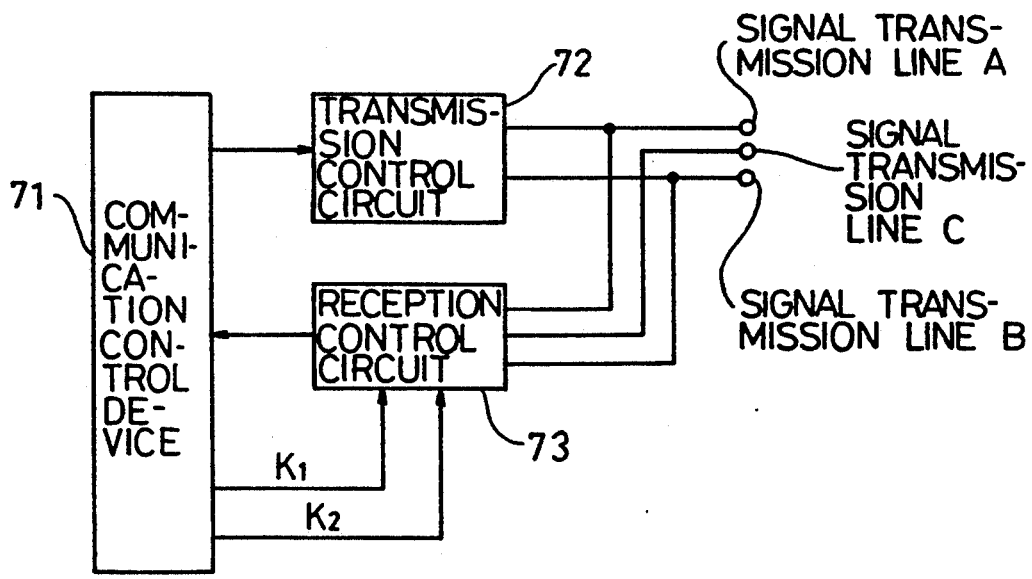
FIG. 14 is a constructional diagram showing a fourth embodiment of the multiplex node.

Further, another concrete circuit construction of the multiplex node is shown in FIG. 14. Referring to the fifth embodiment shown in FIG. 14, the communication control device 71 in the multiplex node can detect the communication possible state of the signal transmission lines from the states of $K_1=K_2=0$, $K_1=1$, and $K_2=1$. That is, the states of $K_1$ and $K_2$ are output to the reception control circuit 73 to select the output signal (potential difference) from the voltage comparator circuit of the reception control circuit 73 and detect the optimum transmission state for the transmission from the transmission control circuit 72. In this case, the number of parts used can be reduced and a multiplex node having the above voltage detection circuit and a multiplex node having no voltage detection circuit can be disposed together.

What is claimed is:

1. A multipath transmission system comprising:
   (1) at least three transmission lines providing at least three transmission paths; and
   (2) at least two multiplex nodes connected in parallel to said transmission lines for multiplex transmission on said transmission lines, each of said multiplex nodes comprising:
   (A) means for transmitting and receiving signals with at least one of the other said multiplex nodes;
   (B) selecting means for selecting one pair paths of said at least three transmission paths for transmitting and receiving said signals with said at least one of the other multiplex nodes, said selecting means comprises:
      (i) means for imposing a sensible characteristic on at least one of said transmission lines, the value of said sensible characteristic being indicative of the operative state of said transmission paths;
      (ii) sensing means for sensing the value of said sensible characteristic and for providing in responsive thereto an output signal indicative of the operative states of said transmission paths; and
   (C) means responsive to said output signal for operatively connecting one of said transmission paths to said means for transmitting and receiving signals between at least one of the other said multiplex nodes.

2. The multipath transmission system of claim 1 wherein;
   said sensible characteristic comprises a discrete voltage: and
   said sensing means comprises means for comparing said discrete voltage to a fixed pair of different reference voltages, wherein if said discrete voltage is lower than the lowest of said pair of reference voltages, a first transmission pair lines is selected, if said discrete voltage is higher than the highest of said pair of reference voltages, a second transmission pair lines is selected, and if said discrete voltage is intermediate said pair of reference voltages, a third transmission pair lines is selected.

3. The multipath transmission system of claim 2 wherein:
   said sensing means comprises a pair of voltage comparators and said output signal of said sensing means comprises a pair of digital output voltages; and
   said responsive means comprises a set of switches connecting said transmission lines to said transmitting and receiving means, a different pair of switches being closed by each distinct pair of digital output voltages.

4. The multipath transmission system of claim 3 wherein at least one of said multiplex nodes further comprises means for testing each of said transmission paths for possible transmission therethrough, said testing means controllably actuating said imposing means for imposing different discrete voltages on said at least one of said transmission lines, thereby forcing said selecting means to select different pair ones of said transmission paths for transmission of said signals.

* * * * *